(12) United States Patent
Holst et al.

(10) Patent No.: US 6,736,443 B2
(45) Date of Patent: May 18, 2004

(54) COVER ARRANGEMENT FOR VEHICLES WITH REMOVABLE VEHICLE ROOF

(75) Inventors: Christian Holst, Hamburg (DE); Andreas Hasselgruber, Eberdingen-Nussdorf (DE); Thomas Halbweiss, Remseck (DE); Matthias Roesler, Stuttgart (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/303,104

(22) Filed: Nov. 23, 2002

(65) Prior Publication Data

US 2003/0098593 A1 May 29, 2003

(30) Foreign Application Priority Data

Nov. 27, 2001 (DE) .......................... 101 57 818

(51) Int. Cl.⁷ .................................................. B60J 7/00
(52) U.S. Cl. ........................... 296/107.08; 296/107.01; 296/136.06
(58) Field of Search ....................... 296/107.08, 107.06, 296/107.01, 136.06

(56) References Cited

U.S. PATENT DOCUMENTS

| | | | | |
|---|---|---|---|---|
| 2,046,574 A | * | 7/1936 | Olivier ................... | 296/107.08 |
| 2,747,928 A | * | 5/1956 | Olivier et al. ......... | 296/107.08 |
| 3,180,677 A | * | 4/1965 | Scott ...................... | 296/107.08 |
| 4,746,163 A | * | 5/1988 | Muscat ................... | 296/107.08 |
| 4,799,729 A | * | 1/1989 | Muscat ................... | 296/136.06 |
| 5,295,722 A | * | 3/1994 | Bonne et al. .......... | 296/107.08 |
| 5,558,389 A | * | 9/1996 | Rothe et al. ........... | 296/107.08 |
| 5,921,608 A | * | 7/1999 | Schmitt et al. ........ | 296/107.08 |
| 5,967,593 A | * | 10/1999 | Schuler et al. ......... | 296/107.08 |
| 6,010,178 A | * | 1/2000 | Hahn et al. ............. | 296/107.08 |
| 6,039,382 A | * | 3/2000 | Mather et al. ......... | 296/107.08 |
| 6,062,628 A | * | 5/2000 | Guillez ................... | 296/107.08 |
| 6,145,915 A | * | 11/2000 | Queveau et al. ....... | 296/107.08 |
| 6,168,224 B1 | * | 1/2001 | Henn et al. ............. | 296/136.06 |
| 6,254,165 B1 | * | 7/2001 | Neubrand ............... | 296/107.08 |
| 6,315,349 B1 | * | 11/2001 | Kinnanen ............... | 296/107.01 |
| 6,318,792 B1 | * | 11/2001 | Neubrand et al. ..... | 296/107.08 |
| 6,508,504 B1 | * | 1/2003 | Just et al. ............... | 296/107.08 |
| 6,604,774 B2 | * | 8/2003 | Koch et al. ............. | 296/107.08 |
| 6,616,213 B2 | * | 9/2003 | Koch ...................... | 296/107.08 |
| 2001/0005089 A1 | * | 6/2001 | Neubrand ............... | 296/107.01 |
| 2003/0020298 A1 | * | 1/2003 | Koch ...................... | 296/107.08 |

* cited by examiner

Primary Examiner—Kiran Patel
(74) Attorney, Agent, or Firm—Klaus J. Bach

(57) ABSTRACT

In a cover arrangement for a storage compartment for a removable vehicle roof with a storage compartment cover which is movable between a closed position and a clearing position, and wherein the storage compartment cover includes a center part and two side parts with an operating mechanism for the center part and actuating mechanisms for the side parts, the center part and the side parts are supported on the vehicle body in a common plane when the storage compartment is closed but are movable to a clearing position for the movement of the roof into, and out of, the storage compartment, the side part actuating mechanisms being inter-linked with the center part operating mechanism for moving the side parts together with the center part.

8 Claims, 2 Drawing Sheets

COVER ARRANGEMENT FOR VEHICLES WITH REMOVABLE VEHICLE ROOF

BACKGROUND OF THE INVENTION

The invention relates to a cover arrangement for a vehicle with a removable vehicle roof, wherein the cover is movable between a cover position assumed in an end position of the vehicle roof and a release position which is assumed for the transfer of the vehicle roof between its two end positions.

EP 0 302 963 B1 discloses a tripartite storage space cover including a center part and two side flaps which are pivotally connected to the center part by pivot joints. In the closed position and in the storage position of the vehicles roof, the center part of the cover is in a horizontal position and the side flaps are sidewardly extended from the center part. For the transfer of the vehicle roof between the closed and the storage positions, the center part is pivoted about an axis extending transverse to the vehicle, whereby a storage space disposed below the cover becomes accessible. At the same time, the side flaps are pivoted about their pivot joints inwardly onto the center part whereby also the side areas of the storage space are accessible and sufficient space is made available for passing the vehicle roof.

In addition to being joined to the center part by way of the pivot joints, the side flaps are pivotally connected to parts of the vehicle body by way of two additional joints. The pivot movements of the three pivot joints of each side flap must be adjusted to each other with high precision since otherwise the movement of the side flaps may be blocked. Because of aging, changing elasticity and play, jamming of the side flaps is possible however. Another disadvantage is the fact that the arrangement with three connecting joints of the side flaps with the center part and parts of the vehicle body is relatively expensive.

A tripartite cover consisting of a center part and two side flaps is furthermore known from DE 197 12 967 A1. The side flaps are pivotally connected exclusively to the center part by way of a lift pivot joint. For their transfer into the inwardly pivoted position, they are first lowered from the plane of the center part and then pivoted inwardly. The movement of the side flaps relative to the center part is controlled by a hydraulic cylinder. No coordinated movement of the center part and the side flaps is provided for in DE 197 12 967 A1.

It is the object of the present invention to provide in a convertible vehicle a tripartite cover arrangement with a center cover part and two side parts such that with simple design measures the movement of the side parts is force-coupled with the movement of the center part of the cover, in such a way that the side parts in an inwardly pivoted position, are adaptable with large play to the respective surrounding components.

SUMMARY OF THE INVENTION

In a cover arrangement for a storage compartment for a removable vehicle roof with a storage compartment cover which is movable between a closed position and a clearing position, and wherein the storage compartment cover includes a center part and two side parts with an operating mechanism for the center part and actuating mechanisms for the side parts, the center part and the side parts are supported on the vehicle body in a common plane when the storage compartment is closed but are movable to a clearing position for the movement of the roof into, and out of, the storage compartment, the side part actuating mechanisms being inter-linked with the center part operating mechanism for moving the side parts together with the center part.

There are no other connections between the side parts and the center part. In this way, the freedom of kinematic movement of the side parts with respect to the center part is increased since the side parts are not directly connected to the center part, but only by way of a kinematic actuating mechanism. In the area of the respective actuating mechanism, there is in principle, any number of coupling possibilities whereby the movement of the side parts can be achieved in a predetermined way by a coupling of the movement of the center part with the movement of the side parts. The side parts are connected by the kinematic operating mechanism directly to the vehicle body or a component connected to the vehicle body. The degrees of freedom which are provided for the side parts by the side part actuating mechanism are determined by the coupling link between the side part actuating mechanism and the center part operating mechanism. Since no other coupling structures exist between the side parts and other components, the danger of jamming of the side parts is reduced in comparison with the state of the art. With the coupling of the actuating mechanism and the operating mechanism there is for each position of the center part exactly one position of the side parts so that no special drive for the side parts is needed that is the drive for the operation of the center part is sufficient.

In an advantageous embodiment, the center part operating mechanism is connected to the vehicle body by two main arms which are pivotally connected to the vehicle body and which are each coupled with the center part by an intermediate link. The two main arms are also linked each with the actuating mechanism for one of the side parts. The two main arms may be interconnected by a connecting rod, which synchronizes the movement of the two main arms so that, basically, only one of the two main arms needs to be operated for moving the center part as well as the side parts. Such movement may be initiated by an actuator, but it may also be coupled with the roof operating mechanism by way of which the movable vehicle roof is moved between the closed position and the open position in which it is deposited in a storage compartment.

The side part actuating mechanism comprises in a preferred embodiment a support arm, which is pivotally connected to the vehicle body and to a side part, particularly by pivot joints, which permit a spatial pivot movement. Furthermore, a side part control arm may be provided which is also pivotally connected to the vehicle body and to the side part preferably by ball joints, for permitting a spatial pivot movement. By the relative arrangement of the side part support arm and the side part control arm, a spatial pivot movement of the side parts can be achieved by which the side parts are moved below the center part.

In this arrangement, the coupling arm is expediently connected to the support arm of the side part actuating mechanism which can be made stronger that the control arm and which can accommodate most of the weight of the side part whereas the control arm is responsible mainly for the control of the pivot movement of the side part.

The invention will become more readily apparent from the following description thereof on the basis of the accompanying drawings.

DESCRIPTION OF PREFERRED EMBODIMENTS

Figure 1:
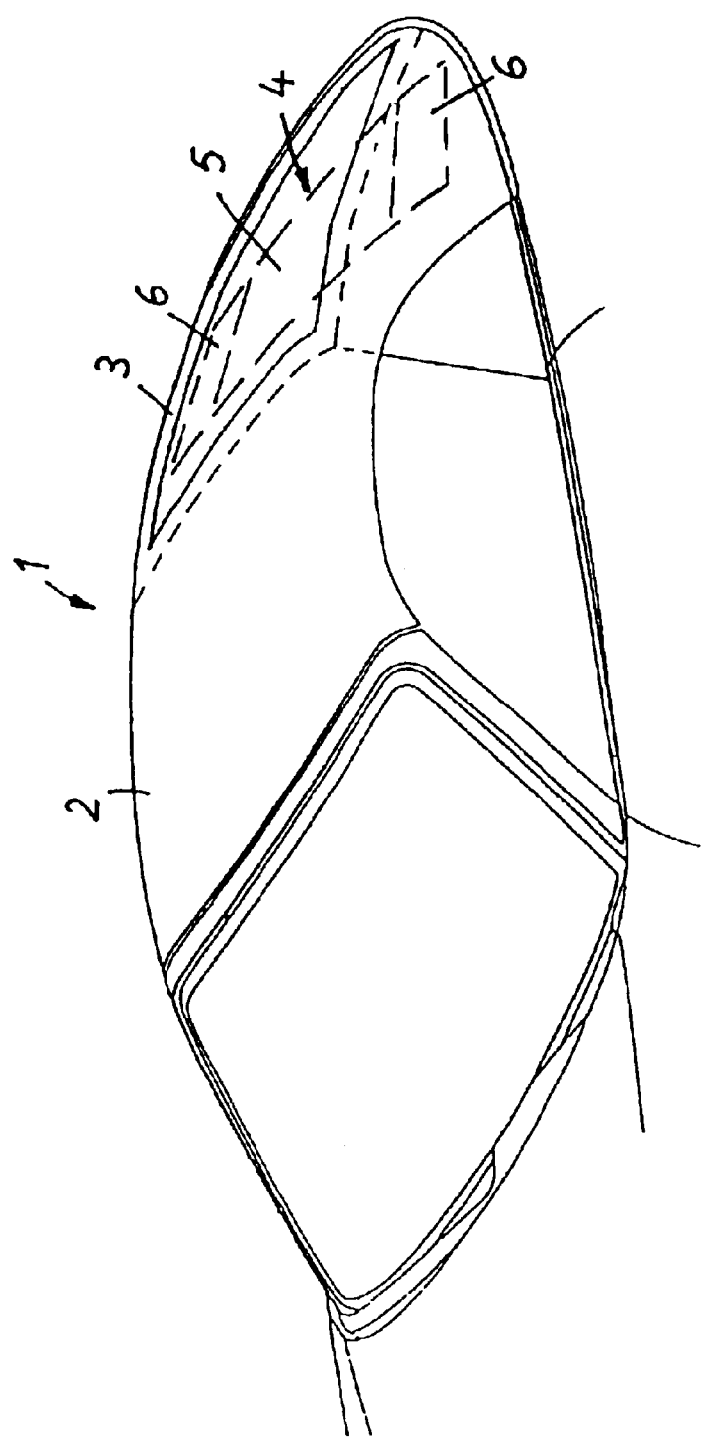
FIG. 1 shows a movable vehicle roof in its closed position with a schematically indicated tripartite storage cover comprising a center part and two side parts.

In the figures, identical components are designated by the same reference numerals, FIG. 1 shows a hardtop vehicle roof 1 including a front roof section 2 and a rear roof section 3. The roof sections 2, 3 are movable between a first closed position as shown in the figure wherein the roof covers an interior space of a vehicle and a second storage position in which the vehicle roof sections are deposited in a rear storage compartment. Although a hardtop is shown, the roof may be a soft top roof. The storage cover according to the invention is applicable for either.

Figure 3:
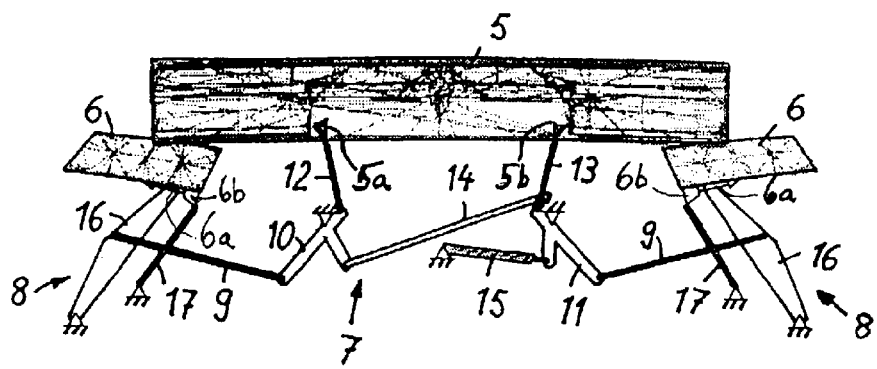
FIG. 3 shows the storage cover in an intermediate position during its transfer from the horizontal cover position to a vertical clearing position.
Figure 4:
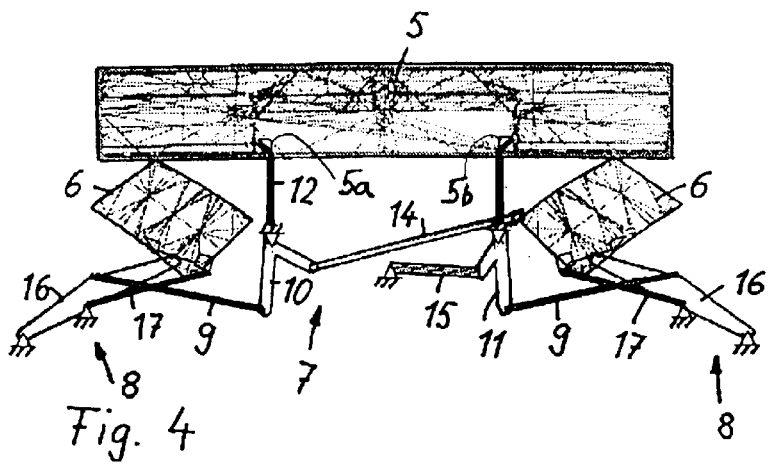
FIG. 4 shows the storage cover in the vertical clearing position in which the side parts are pivoted into a position below and adjacent to the center part.

In the rear part of the vehicle interior, there is a storage compartment over which the vehicle roof 1 extends and on which a storage compartment cover 4 is disposed. The storage cover 4 is a tripartite structure comprising a center part 5 and two side parts 6. The storage cover 4 closes at least partially the storage compartment for the vehicle roof 1. For the transfer of the vehicle roof 1 between the first and second positions, the storage compartment cover 4 must be moved from the horizontal cover position as shown in FIG. 1 to an upright clearing position so that the roof parts and the roof operating mechanism can be deposited in the storage compartment or lifted out of the storage compartment. The movement of the storage cover 4 between its cover position and its clearing position and the operating and actuating mechanisms for the storage cover compartment 4, providing for the appropriate movements thereof are shown in FIGS. 2–4.

Figure 2:
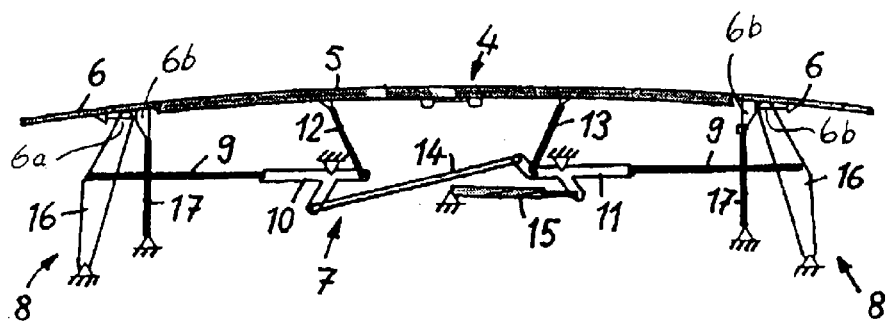
FIG. 2 shows the storage cover in its horizontal cover position in a rear view showing also the operating mechanism for the center part and the actuating mechanisms for the side parts.

FIG. 2 shows the storage cover 4 from the rear in a horizontal position in which it covers the storage compartment. The center part 5 is supported by a center part operating mechanism 7 by way of which the center part 5 is pivotally connected to the vehicle body. There are no other connections between the center part 5 of vehicle components.

The center part operating mechanism 7 comprises two main operating arms 10 and 11, which are pivotally supported on the vehicle body or on components of the vehicle body and which are each pivotally connected to a center part support arm 12 and respectively, 13 which is pivotally connected to the center part 5. The main operating arm 11 is engaged by an actuator 15, which is preferably a hydraulic operating cylinder. In the cover position as shown in FIG. 2, the actuator 15 is extended to its full length. By retracting the operating rod of the actuator 15, the main operating arm 11 is pivoted about its pivot connection with the vehicle body whereby the storage cover 4 is moved from its cover position as shown in FIG. 2 to the clearing position as shown in FIG. 4. The main operating arms 10 and 11 are bent-over at their ends adjacent the center part 5 and the bent-over ends are pivotally supported in bearing structures 5a and 5b respectively, which are so arranged that, with the pivot movement of the main operating arms 10 and 11, the center part 5 of the storage cover is moved from the horizontal cover position to the upright clearing position according to FIG. 4.

Instead of being operated by an actuator 15, the operating mechanism may also be connected to a roof operating mechanism so as to be operated by the movement of the vehicle roof.

The two main operating arms 10 and 11 are interconnected by a connecting rod 14 which transmits the pivot movement of the main operating arm 11 as effected by the actuator 15 to the main operating arm 10 so as to provide for a corresponding pivot movement of the main operating arm 10. In this way, only one of the main operating arms 10 and 11 must be operated by the actuator 15.

The side parts 6, which, in the cover position according to FIG. 2, are disposed in a common horizontal plane with the center part 5, are actuated by a side part actuating mechanism 8 which provides for a transfer of the side parts 6 from the cover position to the clearing position as shown in FIG. 4. The side part actuating mechanisms 8 at both sides of the center part 5 are each kinematically coupled with the center part operating mechanism 7 in such a way that a particular operating movement of the center part operating mechanism 7 caused by the actuator 15 results in a particular actuating movement of the side part actuating mechanisms 8 and of the side parts 6. The side part actuating mechanisms 8 are coupled to the center part operating mechanism 7 by means of connecting links 9 extending between the main operating arms 10 and, respectively, 11 of the center part operating mechanism and a component of the respective side part actuating mechanism 8. The connecting links 9 are pivotally connected to the main operating arms 10 and respectively, 11 and, with their opposite ends to the respective support arm 16 of the side part actuating mechanism 8.

The side part actuating mechanism 8 comprises the side part support arm 16 as well as a control arm 17. The side part support arm 16 and the control arm 17 are both pivotally connected to the vehicle body and to the side part 6, by pivot joints which permit a spatial pivot movement of the side parts. The connecting link 9 interconnects the side part arm 16 and the main operating arm 10 or, respectively, 11. The support arm 16 is connected to the side part 6 by a joint having an axis 6a about which the side part 6 is tiltable. The control arm 17 is connected to a bracket 6b, preferably by a ball joint so that, with inward pivoting of the support arm 16 and the control arm 17, the side part 6 is moved inwardly with the support arm and, at the same time, tilted about the axis 6a by the control rod, as shown in FIG. 3 until it reaches the position as shown in FIG. 4. Expediently, the side part support arm 16 and the control arm 17 are displaced with respect to each other in the longitudinal direction of the vehicle in such a way that the plane defined by the arms 16 and 17 intersects the plane defined by the center part support arms 13 and 14. As a result of this spatial arrangement of the side part support and control arms 16, 17 with respect to the center part support arms 12 and 13, and their particular attachment to the side parts, a control movement of the center part operating mechanism 7 transmits its movement, by way of the connecting rods 9, to the side part actuating mechanism 8 of each side part 6 so as to provide for a spatial pivot movement of the center part and the side parts from the horizontal cover position as shown in FIG. 2 to a lowered and displaced position as shown in FIG. 4. In the clearing position as shown in FIG. 4, the vehicle roof can be moved between its closed and its storage end positions. When the vehicle roof has assumed a particular end position, the storage cover 4 is returned to it horizontal cover position as shown in FIG. 2.

What is claimed is:

1. A cover arrangement for a storage compartment of a vehicle body with a removable vehicle roof, said cover arrangement including a storage compartment cover movable between a cover position, in which said storage compartment is covered and a clearing position in which access to said storage compartment is cleared, said storage compartment cover including a center part and two side parts, a center part operating mechanism supporting said center part on said vehicle body and actuating mechanisms for supporting said side parts on said vehicle body, whereby said side parts are supported on said vehicle body in a plane with, and at opposite sides of, said center part when said storage compartment is covered by said storage compartment cover, but are movable to said clearing position, said center part operating mechanism and said side part actuating mechanism being inter-linked by connecting links such that movement of said center part by its operating mechanism initiates movement of said actuating mechanisms of said side parts.

2. The cover arrangement according to claim 1, wherein said center part operating mechanism includes two center part support arms which, at one of their ends, are pivotally connected to the center part and at their other ends are pivotally connected to main operating arms of said operating mechanism, which main operating arms are pivotally supported by said vehicle.

3. The cover arrangement according to claim 2, wherein said connecting links are pivotally connected to said main operating arms.

4. The cover arrangement according to claim 2, wherein said main operating arms are interconnected by a connecting rod.

5. The cover arrangement according to claim 2, wherein said side parts are supported on said vehicle by side part support arms and said connecting links are connected to said side part support arms, said side part support arms being pivotally supported on said vehicle body and pivotally connected to said side parts.

6. The cover arrangement according to claim 5, wherein said side parts actuating mechanisms include control arms also extending between said vehicle and said side parts and being pivotally connected to both of them.

7. The cover arrangement according to claim 6, wherein said side part support arms and said control arms are disposed in a plane which is non-parallel to the plane defined by the two center part support arms when said side parts are in a closed position at opposite ends of said center part.

8. The cover arrangement according to claim 1, wherein an actuator is connected to said center part operating mechanism for operating said center part operating mechanism, and, together therewith, said side part actuating mechanisms.

* * * * *